United States Patent
Ingold

(10) Patent No.: US 10,226,058 B2
(45) Date of Patent: Mar. 12, 2019

(54) COLD BREW COFFEE MAKER

(71) Applicant: Jared L. Ingold, Indianapolis, IN (US)

(72) Inventor: Jared L. Ingold, Indianapolis, IN (US)

(*) Notice: Subject to any disclaimer, the term of this patent is extended or adjusted under 35 U.S.C. 154(b) by 120 days.

(21) Appl. No.: 15/272,945

(22) Filed: Sep. 22, 2016

(65) Prior Publication Data
US 2017/0086473 A1    Mar. 30, 2017

Related U.S. Application Data

(60) Provisional application No. 62/222,878, filed on Sep. 24, 2015.

(51) Int. Cl.
| | | |
|---|---|---|
| *A23F 5/26* | (2006.01) | |
| *A47J 31/52* | (2006.01) | |
| *A47J 31/06* | (2006.01) | |
| *A47J 31/40* | (2006.01) | |
| *A47J 31/44* | (2006.01) | |

(52) U.S. Cl.
CPC ............ *A23F 5/26* (2013.01); *A47J 31/0668* (2013.01); *A47J 31/407* (2013.01); *A47J 31/4403* (2013.01); *A47J 31/52* (2013.01)

(58) Field of Classification Search
CPC ....... A23F 5/26; A47J 31/0668; A47J 31/407; A47J 31/4403; A47J 31/52
See application file for complete search history.

(56) References Cited

U.S. PATENT DOCUMENTS

| | | | | |
|---|---|---|---|---|
| 3,016,930 | A * | 1/1962 | Dziedziula | A47J 31/40 141/361 |
| 4,688,479 | A * | 8/1987 | Cunningham | A47G 21/106 100/133 |
| 5,603,254 | A * | 2/1997 | Fond | A47J 31/0668 426/433 |
| 7,858,133 | B2 | 12/2010 | Neace, Jr. et al. | |
| 8,720,321 | B2 | 5/2014 | Neace, Jr. et al. | |
| 9,687,105 | B2 * | 6/2017 | Johnson | A47J 31/0615 |
| 9,808,110 | B2 * | 11/2017 | Saha | A47G 19/16 |
| 2013/0122153 | A1 * | 5/2013 | Ferrier | A47J 31/3633 426/84 |

* cited by examiner

*Primary Examiner* — Anthony J Weier
(74) *Attorney, Agent, or Firm* — Woodard, Emhardt, Henry, Reeves & Wagner, LLP

(57) ABSTRACT

A method and apparatus to brew coffee with cold water and automatically dispense it into a container after a specified brew time. Water and a packet of coffee grounds are introduced to a brew chamber to produce a coffee extract after a specified time and then delivered to a removable receiving container. The packet is compressed to release the maximum amount of extract from the packet. Extract can be diluted with additional water into the removable receiving container to create the beverage. The receiving container is filled and sealed for freshness.

18 Claims, 6 Drawing Sheets

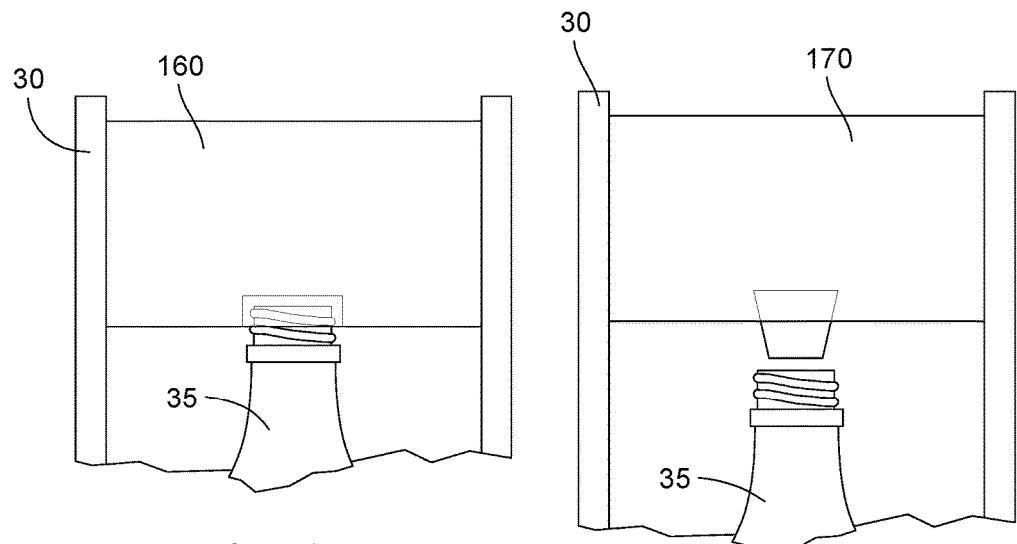
Fig. 13A
Fig. 13B
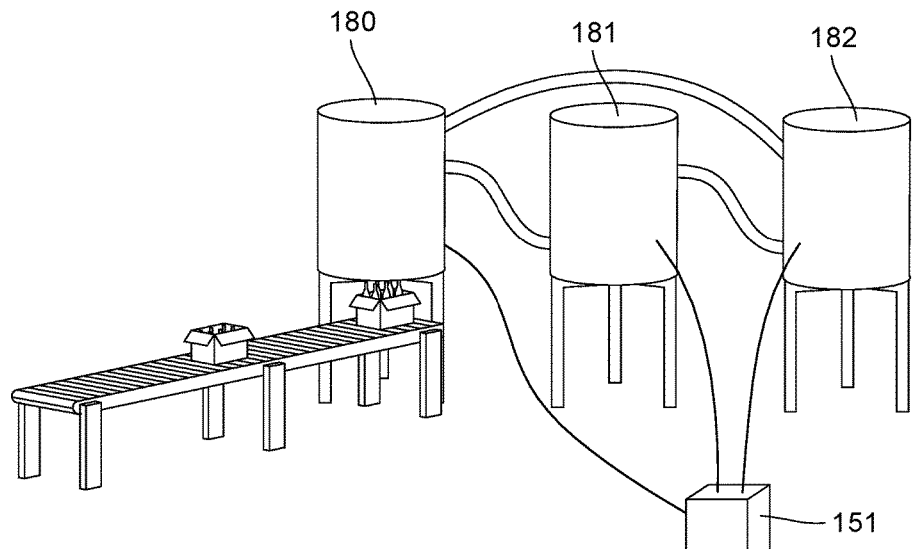
Fig. 14

COLD BREW COFFEE MAKER

BACKGROUND OF THE INVENTION

Field of the Invention

The present invention relates to a coffee maker and a method to brew coffee without the use of supplemental heat in order to produce a coffee extract that is less acidic than hot brewed coffee.

BACKGROUND OF THE INVENTION

Field of the Invention

This invention is in the field of devices and methods for producing cold brew coffee.

Description of the Prior Art

The challenges with brewing coffee cold is that it requires a lot of time, can be messy, and should be removed from the grounds at a specific time to achieve the desired taste. Coffee can be under brewed and over brewed so the goal is to dial in the appropriate brew time and not rely on an individual to be present to finish the process. Cold brewing coffee produces a coffee extract or a concentrate that should be cut with a ratio of water to achieve the proper flavor profile. It can be left as a concentrate and cut with water before consumption or cut right after the brewing process, which is a better method.

One technique to produce cold-brew coffee is disclosed in the U.S. Pat. Nos. 7,858,133 and 8,720,321 issued to Neace, J., et al wherein an hourglass shaped apparatus includes a brew chamber and an extract chamber located at the opposite ends of the apparatus. Water is poured into the brew chamber to generate coffee extract. After the brewing process, the hourglasss is inverted and the coffee travels into the extract chamber.

The prior art devices for producing cold brew coffee rely on pouring cold water over coffee grounds instead of allowing the cold water and coffee grounds to be mixed together for a period of time. Disclosed herein is an apparatus for producing cold brew coffee that does not require the user to monitor or interact with the apparatus once the brewing process is initiated and allows the water and coffee grounds to remain in the brew chamber for a substantial length of time prior to dispensing same.

SUMMARY OF THE INVENTION

One embodiment of the present invention is a device and method for cold brewing coffee. The device includes a housing for holding various components. A packet of coffee grounds is provided in a brew chamber mounted to the housing. A mechanism within the brew chamber squeezes the packet of coffee which is filled with cold water from a source. A logic controller directs water to the brew chamber, initiates the squeezing action and controls the brew time. A pump along with valves may be provided to control liquid flow. An auto capper may also be provided to close the container of brewed coffee.

Many advantages and benefits of the present invention will be apparent from the following description. Some of the benefits are:
 the use of pre-packaged Cold Brew packets, and/or,
 the use of a fillable empty packet to be filled by the user;
 a controlled brew time;
 absence of supplemental heat resulting in a cold brew that is less acidic than a hot brew;
 an automatic process including the squeezing of the packet containing coffee grounds;
 easy cleanup;
 the automatic dispensing of brewed coffee;
 properly dosed growler refills; and,
 auto capping of the coffee container.

Related objects and advantages will be apparent from the following description.

BRIEF DESCRIPTION OF THE DRAWINGS

FIGS. 13(*a*) and 13(*b*) are fragmentary schematic views showing respectively a screw on capper and a cork capper for closing the container receiving the brewed coffee.

FIG. 14 is a schematic showing a production line for producing the cold brew coffee.

DESCRIPTION OF THE PREFERRED EMBODIMENT

Figure 1:
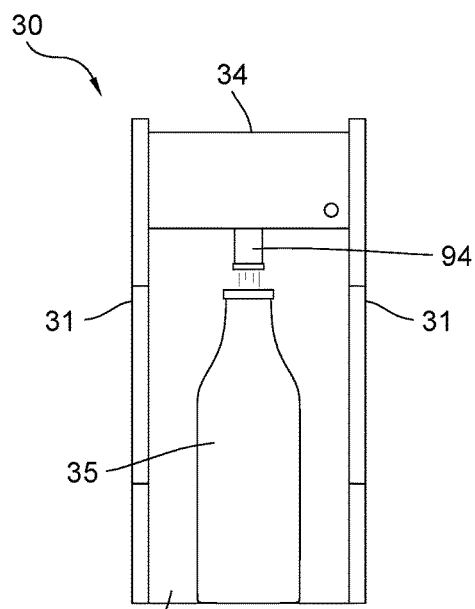
FIG. 1 is a front view of the coffee maker incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The preferred embodiment of the Cold Brew Coffee Maker is illustrated in the drawings. The housing 30, shown in FIGS. 1 and 2 includes a pair of spaced apart side walls 31, bottom 32 and top 34. The Cold Brew Coffee Maker is designed to:
 1. house all the components of the invention,
 2. provide a specific place for the receiving container,
 3. hold the brew chamber above the receiving container, 4. hide some components such as electronics, logic controller, pump, and actuators, and 5. be visually appealing.

Figure 7:
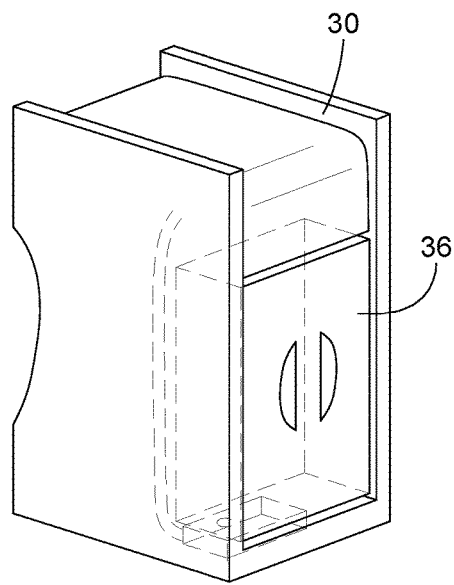
FIG. 7 is a rear perspective view of the coffee maker housing shown in FIG. 3, only with a water container mounted therein.

A water container 36 (FIG. 7) is removably held by the coffee maker housing 30. Container 36 holds the correct volume of water to match the desired output of the coffee maker and may be stored in a refrigerator. Multiple containers 36 may be used separately so that there's a cycle of a containers being refrigerated and used and others queued for brewing. The container is sealable, can be reopened and closed, and is made from materials that are dishwasher safe. Alternatively, the container can be replaced by a water line from an external source of cold water with the water line connected directly to the brew chamber having a packet of coffee grounds position therein.

Figure 3:
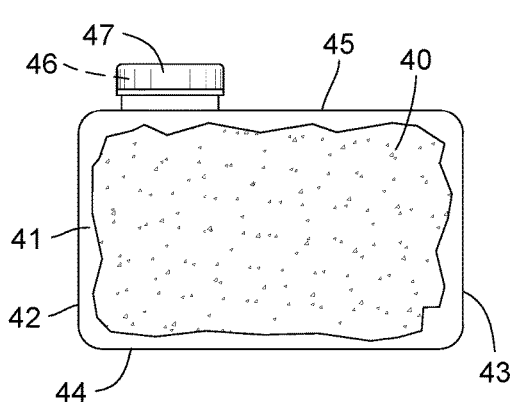
FIG. 3 is a fragmentary side view of a packet with coffee grounds therein.
Figure 15:
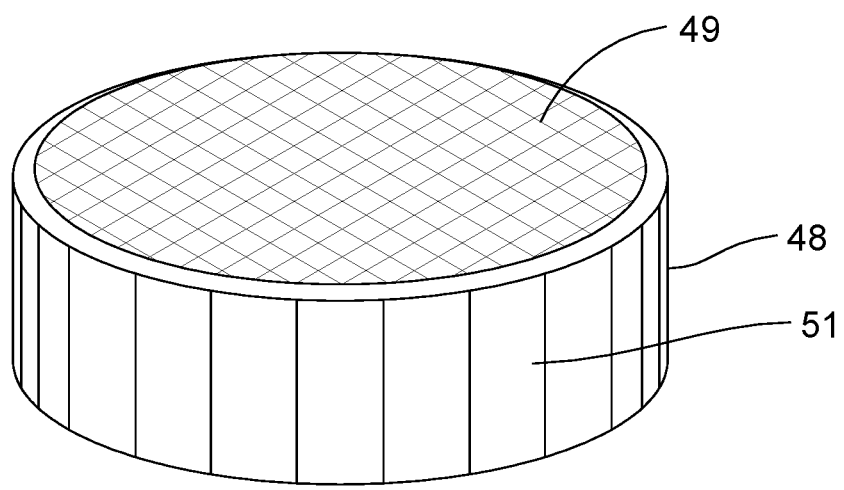
FIG. 15 is a perspective of an alternative cap with build-in filter.

A packet filled with coffee grounds is shown in FIG. 3. The packet is re-useable or disposable depending on the objective and is intended to make it easy and quick to use while providing consistent results. Packet 40 includes a pair of mutually opposed and spaced apart side walls 41 joined together at the opposite ends 42 and 43 and along the bottom 44 thereof forming a cavity for holding coffee grounds. The side walls are joined together at the top 45 of the packet. Side walls 41 are permeable allowing liquid to flow through the side walls. In the preferred version of the packet shown in FIG. 3, an externally threaded inlet 46 located at the top of the packet leads into the cavity of the packet and is closed by a cap 47 threaded on the outlet 46. An alternate cap 48 (FIG. 15) may be utilized rather than cap 47. Cap 48 has a main body 51 with a filter 49 mounted permanently thereto. The filter is made from commercial filtering material, such as paper, plastic and other readily available materials.

Figure 5:
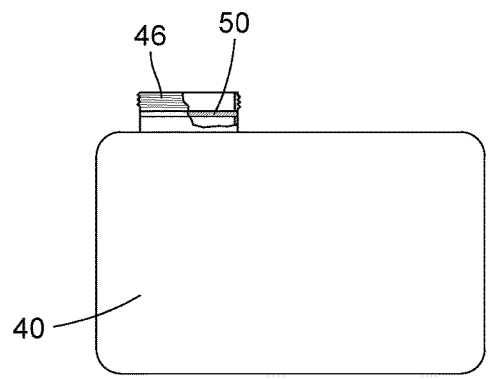
FIG. 5 is a fragmentary side view of a filter mounted in the outlet of the packet of FIG. 3.
Figure 9:
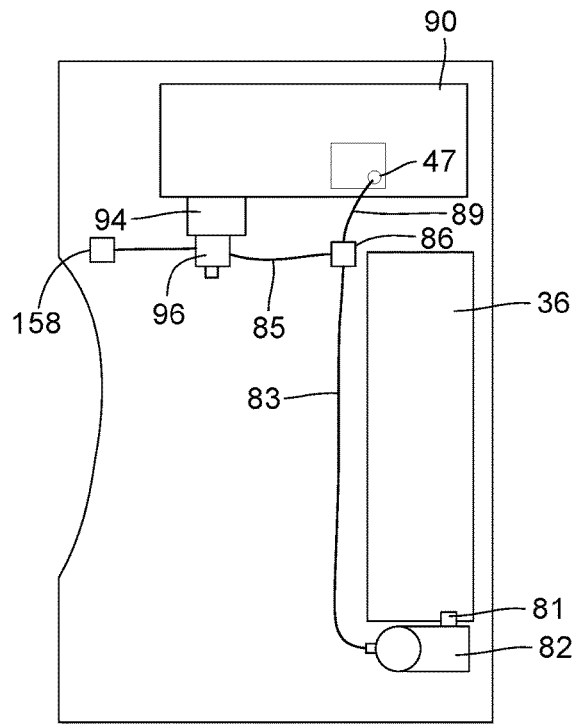
FIG. 9 is a schematic side view of the coffee maker housing showing the connections between a water pump and the brew chamber.

Packet 40 is filled with coffee grounds from the same port or inlet 46 that may then connected to a water line. A standard cap or removable foil is mounted initially to inlet 46 allowing the packet to be shipped without spilling the grounds. The cap or foil is then removed and cap 47 is threaded onto inlet 46 and connected to the water line 89 (FIG. 9) which extends from the source of water and then through cap 47 with the water exiting the water line into the packet. Filter 50 (FIG. 5) is mounted in the inlet 46 so grounds are not spilled while inserting the packet into or removed from the brew chamber. In the event, cap 48 is utilized in lieu of cap 47, cap 48 is removed from the inlet 46 and mounted in line with the outlet 94 (FIG. 9) of the brew chamber either on the side of the outlet 94 within brew chamber 90 or to the side of outlet 94 located exterior of the brew chamber 90. The inlet 46 of the packet 40 is then connected to the water line 89 which extends from the source of water through a cap, such as cap 47 which is installed on the inlet of the packet with the water then entering the packet and wetting the coffee grounds.

Figure 4:
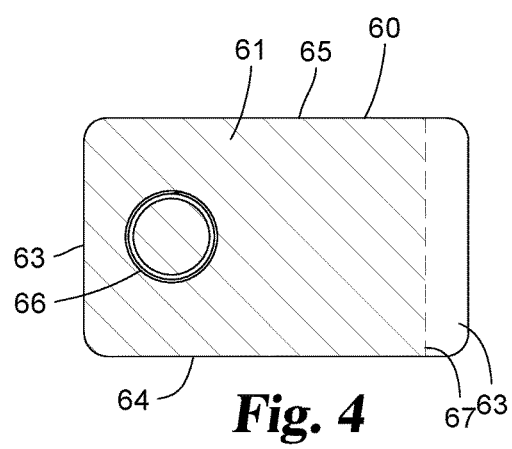
FIG. 4 is a side view of an alternate version of the packet of FIG. 3.

A first alternative version of the packet is shown as packet 60 in FIG. 4. Packet 60 is identical to packet 40 and thus has a pair of liquid permeable side walls 61 joined together at the opposite ends 63, bottom 64 and top 65 forming an internal cavity for holding the grounds; however, the inlet 66 is provide on the side of the packet instead of on top of the packet as is the case with packet 40. Externally threaded inlet 66 is provided on one of the side walls 61 of packet 60. Further, one end 63 is closed by sewing 67 or other commercial methods allowing the coffee grounds to be inserted into the packet through the end of the packet and then closed.

The preferred embodiment of the Coffee Maker provides water via a pressurized source and/or through the use of a pump with the water routed via a water line directly to the packet. The water line extends through the cap of the packet and into the cavity of the packet so that the water is forced against the grounds within the packet. The present invention contemplates and includes an alternative approach wherein the water is directed into the brew chamber 90 (FIG. 9) surrounding the packet with the water then flowing from line 89 into the brew chamber and through the packet side walls and into the packet cavity.

Figure 6:
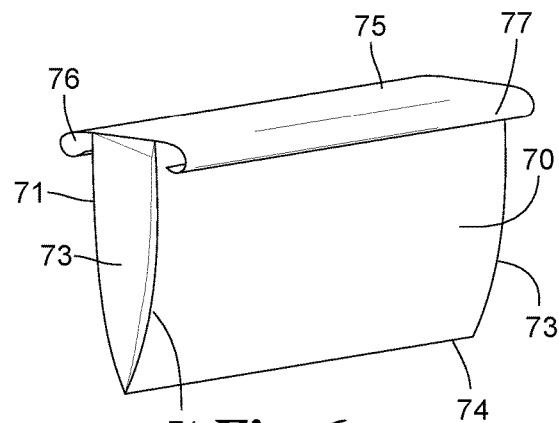
FIG. 6 is a perspective view of a further alternate version of the packet of FIG. 3.

A second alternative version of the packet is shown as packet 70 in FIG. 6. Packet 70 has a pair of liquid permeable side walls 71 joined together at the opposite ends 73, bottom 74 and top 75 forming an internal cavity for holding the coffee grounds. Packet 70 does not have an inlet nor is it attached to a water line. Instead, the cold water is routed directly from line 89 into the brew chamber holding packet 70 with the water then flowing through the liquid permeable side walls 71 into the packet and to the grounds contained in the packet. Wings 76 and 77 are provide at the top 75 of the packet and located above the side walls 71 to enable the packet to be held in the brewing chamber having means to engage and hold the wings in position. Alternative means are contemplated for holding the packet in place other than the wings.

Filter 50 (FIG. 5) is provided in inlets 46 and 66 to allow water to flow through the inlet into the cavity while preventing coffee grounds to back flow through the cap. The filter extends across or within the inlet and is produced from conventional material, for example, fabric, paper or plastic, to allow liquid flow there through while limiting grounds from escaping from the cavity via the inlet.

There are many variables when making coffee and thus, it is desirable to provide a packet for providing consistent results. The packet disclosed herein is designed allowing the packet to:

1. be easily filled with coffee grounds,
2. be sealed so that grounds are contained,
3. act as a filter,
4. be disposable or reusable,
5. be compressed, squeezed, or twisted to extract the liquid from it,
6. be attachable to a water line so water can be pumped through it, if the water container is separate from the brew container,
7. be used with a check valve, screen, or flap to prevent grounds from back flowing into the pump. It may also receive the coffee grounds from the side (FIG. 4) and be sealed by heat or sewn and then the water line is attached on top of the filter material so that water flows through the filter while preventing movement of grounds through the filter.

Using the brew chamber as the water container instead of providing a separate container 36 (FIG. 7) is a simpler method and has a lower price point for the consumer. It may be beneficial to offer this as an option. Regardless of the particular design of the brew maker, cold water is provided to accomplish the brewing of the coffee.

The optional water container 36 (FIG. 9), separate from the brew chamber, utilizes a pump 82 connected to the outlet 81 of container 36 and may be used to fill the brew chamber 90 with water. A water line 83 is connected to the outlet of pump 82 with the opposite end of the water line extending either directly into chamber 90 or directly into and through the packet cap 47 mounted to the inlet 46 for packet 40 (FIG. 3) or inlet 66 of packet 60 (FIG. 4) depending upon which packet is selected. A valve 86 is connected to and between lines 83 and 89 with line 89 then extending through the packet cap. The same pump or a separate pump can also be used to add water to the brew chamber 90 (FIG. 8) once the brewed extract within the chamber has been created in order to get the correct ratio for the final beverage. The pump enables the user to add more water than is necessary for a single brew cycle so that refills are not needed as often. Alternatively, if the brew chamber and water container are combined into a single chamber, then the user adds water via pump 82 or manually pours water directly into brew chamber allowing for the creation of the extract with additional water being added after brewing is completed. In either case, the final brewed coffee is automatically dispensed from outlet 94 (FIG. 9) into the removable receiving container 35 (FIG. 1) located directly beneath outlet 94. A valve 96 (FIG. 9) is provided between outlet 94 and the receiving container 35 to control the flow of coffee into the receiving container. Water may be added via waterline 85 between valves 86 and 96. Valve 86 controls the water to the chamber or packet.

Figure 2:
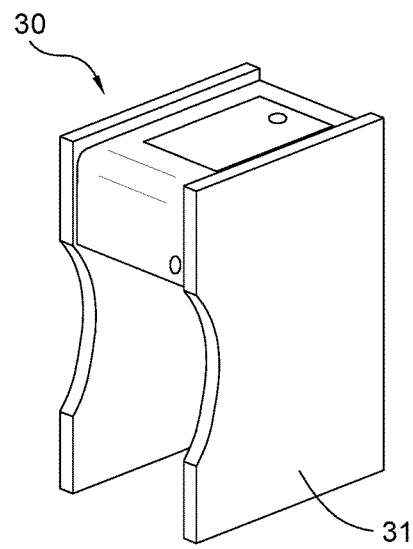
FIG. 2 is a front perspective view thereof.
Figure 10:
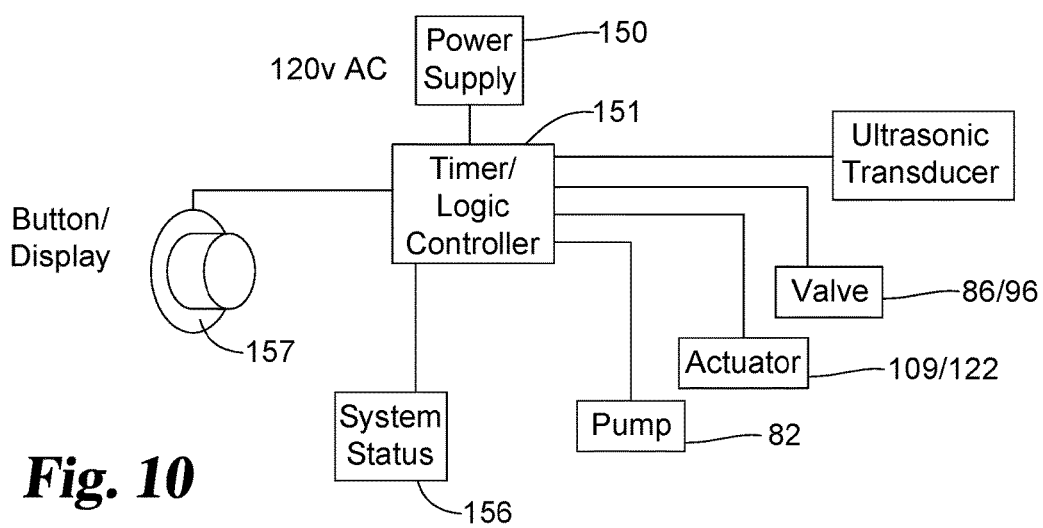
FIG. 10 is a schematic for the Logic Controller operably connected to various components.

A timer 158 is operatively connected to the outlet valve 96 (FIG. 9) to control the operation of the valve and thus, the time of the brew cycle. In other words, timer 158 is operative to keep valve 96 in the closed position thereby allowing the cold water and coffee grounds to remain together for a period of time. Best results are obtained for the water and grounds to remain together for at least 12 hours although the brew time may be extended to 20 hours to insure the quality of the coffee. Once the pre-selected time has expired, timer 158 is operable to open valve 96 with the coffee then flowing through the outlet and into the final container 35 (FIG. 1). A separate timer 158 may be provided or built into the logic controller 151 (FIG. 10).

Figure 8:
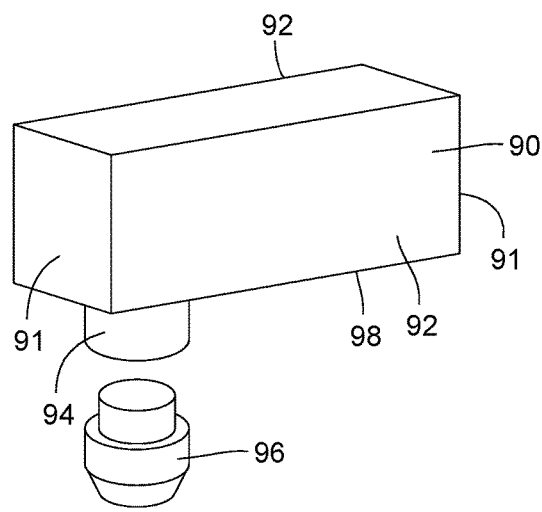
FIG. 8 is a perspective view of the brew chamber with a valve connectable to the outlet port of the brew chamber.
Figure 11:
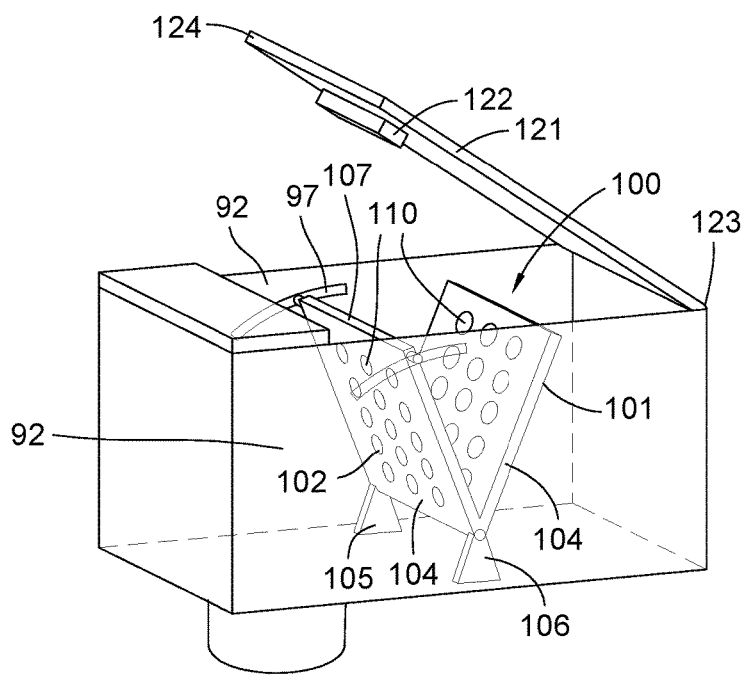
FIG. 11 is a perspective view of the brew chamber with a v-shaped squeezer for compressing the coffee packet.
Figure 12:
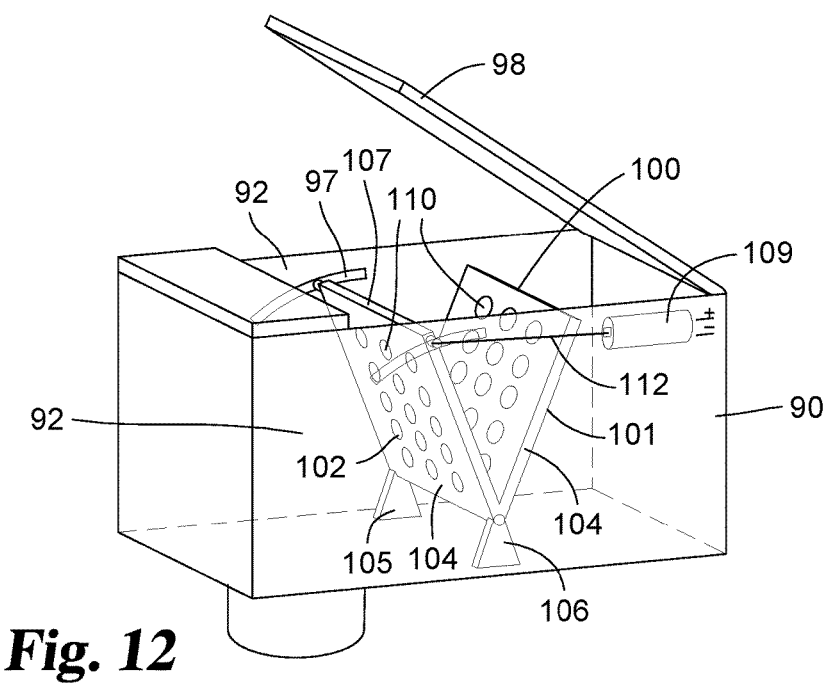
FIG. 12 is the same view as FIG. 11 only illustrating an alternative mechanism for compressing the coffee packet.

The brew chamber 90 (FIG. 8) is where the water and the packet are left for a timed period in order to brew the coffee into an extract. The brew chamber has side walls 91 joined to front and back walls 92 and to a bottom wall 98. Outlet 94 is provided on bottom wall 98. The chamber is shown in FIG. 8; however it is understood that a hinged lid may be mounted to the chamber for opening and closing the cavity as shown in FIGS. 11 and 12. The brew chamber is sized so that the proper amount of coffee is provided for the receiving container. A water level indicator may be provided on the brew chamber if the unit doesn't have a separate water container. In addition, the brew chamber may include an agitator to reduce brew time. The agitator may include but is not limited to an apparatus that houses and moves the packet during brewing so that the water is agitated. In lieu of a mechanism for moving the packet for agitating the water, an ultrasonic transducer may be located within the brew chamber or a separate pump may circulate the water within the chamber.

Once the water has been forced through the cap into the packet cavity or the water has been directed into the brew chamber with the water surrounding the packet, the water interacts with the coffee grounds within the packet producing the extract. An extracting device 100 (FIGS. 11 and 12) is used to squeeze, twist or compress the packet so that the user obtains the highest yield from the coffee. The compressing of the packet also helps make the later removal of the packet less messy to throw away since the packet itself will hold a lot of liquid.

A v-shaped extractor 100 has a first wall 101 fixedly mounted in the brew chamber with an opposite wall 102 pivotably mounted to the bottom of wall 101. The top end of wall 102 has a projection 107 that rides in curved grooves 97 formed in the side walls 92 of the brew chamber. In the version shown in FIG. 11, catch 122 is slidably mounted beneath and to the lid 121 enclosing the cavity of the brew chamber. When the lid is closed the catch 122 is caused to slide toward the v-shaped extractor forcing wall 102 toward wall 101 thereby squeezing the coffee packet 40 or 60 or 70 located between the two walls 101 and 102 with the liquid in the packet then flowing outwardly through apertures 110 in each wall 101 and 102. Catch 122 is spring loaded toward end 123 of lid 121 thereby contacting and forcing wall 102 toward wall 101 when the lid is closed. When the lid is opened the catch is reset by moving the catch toward end 124 of the lid.

An alternative version of the extractor is illustrated in FIG. 12 wherein an actuator 109, such as, as a solenoid or worm gear mechanism squeezes walls 101 and 102 together thereby squeezing and compressing the packet as compared to catch 122 (FIG. 11). The extractor 100 of the FIG. 11 version is identical with the FIG. 12 version except for the catch 122 and actuator 109. The bottom ends 104 of walls 101 and 102 for both versions are mounted to and atop bosses 105 and 106 provided on the bottom of the brew chamber. Lids 98 and 121 are hingedly mounted to the brew chamber and may be opened and closed to allow insertion and removal of the packet. Actuator 109 is mounted to the brew chamber and includes a link 112 connected to wall 102 to move wall 102 toward and away from wall 101 to squeeze the packet located therebetween.

Extractor 100 squeezes the packet of coffee grounds; however, the present invention includes mechanism to twist or compress the packet in order to achieve maximum yield.

Extractor 100 can be cleaned by
1. making it removable, such as mounting the bottom ends 104 (FIG. 11) by snapping ends 104 into bosses 105 and 16,
2. having the lid open enough to wipe and clean the brew chamber, and
3. flushing the water used to cut the extract through the brew chamber.

Pump 82 (FIG. 9) can have multiple functions and may require more than one pump. Functions of the pump include:
1. moving water from the water container to the brew chamber via line 83,
2. moving water into or past the packet to agitate during the brew time,
3. moving extract into the receiving container,
4. moving water into the receiving container via optional water line 85, A Timer/Logic controller 151 (FIG. 10) is provided and may:
1. be powered by standard 120 v AC or battery power supply 150,
2. have a display 157 to allow user to select a brew by time or flavor profile,
3. have a display 156 to show time left on brew cycle,
4. have a selector to input brew time or flavor profile,
5. have a selector to start the brew,
6. have sensors to prevent unwanted input such as starting a brew without a receiving container in place,
7. show system status such as water level,
8. control pump(s),
9. control valves 86 and 96,
10. control actuators 109 and 122, and,
11. control ultrasonic transducers located in the brew chamber to agitate the extract. Logic Controller 151 includes a timer to control the timing of opening and closing of valves 86 and 96 and thus the flow of water direct to the brew chamber 90, or container of coffee grounds 40, 60, 70 and to the receiving container 35.

The method of producing cold brew coffee utilizing the coffee maker disclosed herein includes one or more of the following steps.

Power—User plugs device into a standard wall outlet, which powers the apparatus. The display shows a default brew-time setting (i.e. "18 hours") and with an indicator showing the device is "Not Ready".
1. Setup—The user loads packet and adds water to the brew chamber in the instance that water is not pumped into the packet or brew chamber and then closes the lid. The removable receiving container 35 is placed in the dispensing location which is furnished with a standard auto capper either of the screw on version 160 (FIG. 13(*a*) or the cork version 170 FIG. 13(*b*) furnished on the coffee maker housing 30. Once the criteria are met the system display will indicate "Ready". A number of sensors to determine the readiness. For example:
   1. A water level sensor detects that the water level is adequate in the water container,
   2. A water level sensor detects that the water level is adequate in the brew chamber,
   3. A switch or sensor detects that the lid is closed,
   4. A switch or sensor verifies that the removable receiving container is in place, and
   5. A switch or sensor verifies that the cap or cork is in place in the Auto Capper.
2. Startup—The display now indicates "Ready". User can push button to start default brew time or they can turn a knob to change the brew time, and then push start. An indication of time starts on the display as well so the user can see how much time is left in the process.
3. Brew—Starting the brew process will start the timer. On models that have an isolated water container 36 (FIG. 9) the Logic Controller will also start pump 82 and fill the brew chamber or packet of coffee to the appropriate level. A water level sensor will stop the pump from overfilling.
4. Agitation—Once filled the logic controller will signal an agitation method to start. The agitation stage may be timed separately so it only occurs during part of the brew timer.

Some examples:
1. The logic controller may start an ultrasonic transducer to move the water,
2. On models with an isolated water container, once pump 82 finishes filling the brew chamber the logic controller may switch a valve so the pump forces air into the brew chamber instead of water so that the water moves around. Alternatively, the pump may be used to recirculate the brew chamber water,
3. A separate device may move a fin or the packet holder in the water.
5. Dispense—When the brew timer finishes, the logic controller stops the agitation method if still active. The dispense valve 96 is then open. A dispense timer starts to give enough time for the extract to exit the brew chamber, and then the packet extraction is signaled to squeeze the packet. If the model includes a pump:
   1. a sensor will detect with the brew chamber is empty,
   2. the dispense valve will close,
   3. the brew chamber will be filled with fresh water,
   4. a sensor will shut off the pump when it if filled and re-open the dispense valve which will finish filling the receiving container so that the extract is now a drinkable beverage,
   5. the squeezing of the packet is deactivated during this process so that the brew chamber is flushed and cleaned for the next use
5. Auto capping—after the dispensing of the coffee into receiving container 35, the dispense valve 96 closes. The removable receiving container 35 is capped by one of these methods:
   1. the container is screwed directly onto the apparatus so that an auto cap is not necessary,
   2. the container is shifted by actuators and a cork or cap is put on it,
   3. the container stays in the dispense location and a cap or cork swings over it and is placed on top using an actuator.
6. Reset—After the above steps are completed the display indicates it is finished.
7. Valves, Actuators, & Ultrasonic Transducers Valves A valve or valves are used to control the dispensing of liquid throughout the process.

Valves can be used to:
1. open to allow water from the water container into the brew chamber (FIG. 9) via the line 83,
2. close and prevent back flow into the pump (valve 86 FIG. 9),
3. re-route pumped water from directly into the packet during the brew process to flush out the brew chamber, and,
4. pump water directly into the receiving container via valve 96.

Actuators

Actuators may be used to:
1. move the packet in order to agitate during the brew process,
2. move a fin to agitate the water during the brew process,
3. squeeze, twist or compress the packet,
4. move the receiving container in and out of place for dispensing
5. move the receiving container in order to auto cap the container.

A commercial version is shown in FIG. 14 and is helpful for use in commercial kitchens, coffee shops. Multiple dispensing ports are provided which line up to a grid of bottles. For instance, if a company sells cold brew bottles and they are arranged 4×3 in a box, the dispensing ports are designed to match such an arrangement. The coffee company would open the box, slide it under the apparatus, wait for dispense, then cap and reseal the box without removing the bottles and handling them individually. The production line includes a tank 182 of cold water connected to a tank 181 serving as the brew chamber in turn connected to a tank 180 for holding the finished cold coffee.

It is anticipated that a method of producing a cold brew coffee could including the steps of:
1. receiving a prepackaged single dose of coffee from subscription service, local store, or grind it on location,
2. inserting a packet,
3. placing a removable receiving container under dispense port,
4. adding filtered water
5. activating controls to
   1. activate pre-determined brew time or
   2. changing the brew time,
6. waiting 12-48 hours for brewing,
7. remove receiving container to drink immediately or refrigerate, and
8. disposal of the packet and washout the container The coffee maker device disclosed herein includes:
1. a prepackaged single dose of ground coffee that acts as the proper filter for the brewing process, can include coffee grounds and water additives such as minerals, is designed to fit the apparatus so that an agitator can squeeze, twist or compress it in a way to extract the most liquid from it after the determined brew time, 2. a lid,
3. a container that,
    1. indicates the proper water fill level,
    2. receives the prepackaged coffee,
    3. houses the agitator components,
        1. ultrasonic or,
        2. pump or,
        3. mechanical movement,
4. an agitator that,
    1. holds coffee in the proper brewing position,
    2. rotates the prepackaged coffee,
    3. agitates the water and coffee for better extraction,
    4. squeezes the coffee to remove excess water after brew time,
5. a pump that,
    1. moves water to the brewing chamber,
    2. moves extract to the receiving container,
    3. adds water to the receiving container,
6. a valve that,
    1. is controlled by a timer,
    2. opens for a set period of time to dispense brewed beverage,
7. a housing for a container to receive the beverage for drinking,
8. a device to auto cap the receiving container after fill.

Many variations of the present invention are included herein. Best results have been achieved by allowing the water and coffee grounds to brew for 12 to 24 hours with the water being at room temperature. If the coffee grounds are ground fine, then typically a longer brew time is required as compared to using course ground coffee. The incoming water line may extend directly into the brew chamber or through the cap for the container of coffee or through the side walls or end walls of the container of coffee.

While the invention has been illustrated and described in detail in the drawings and foregoing description, the same is to be considered as illustrative and not restrictive in character, it being understood that only selected embodiments have been shown and described and that all changes and modifications that come within the spirit of the invention are desired to be protected.

The invention claimed is:

1. A system for cold brewing coffee comprising:
   a container of coffee grounds;
   a source for providing cold water;
   a main frame including a brew chamber for receiving cold water from said source and holding said container of coffee grounds to allow mixing of said water with said coffee grounds, said brew chamber having an outlet to allow brewed coffee to flow therefrom;
   a squeezing mechanism within said brew chamber for holding said container of coffee grounds and squeezing same; and,
   an actuator coupled with said squeezing mechanism for moving said mechanism to squeeze said container of coffee grounds therein, wherein:
   said container has a permeable wall allowing water in said brew chamber to wet coffee grounds within said container,
   said squeezing mechanism has a pair of mutually opposed walls allowing flow of water to said container,
   said walls are movable by said actuator to squeeze said container and create coffee extract within said brew chamber.

2. The system of claim 1 wherein:
   said source includes a water receptacle coupled to said brew chamber; and, further comprising:
   a water valve to control flow of said water from said receptacle to said brew chamber.

3. The system of claim 1 wherein:
   said mutually opposed walls form an upwardly opening v-shape with adjacent bottom ends and spaced apart top ends, said brew chamber has a guide slidably receiving and supporting at least one of said top ends as said actuator moves at least one of said walls toward the other squeezing said container located between said walls.

4. The system of claim 1 and further comprising:
   a timer operably connected to said outlet of said chamber to control the amount of time said cold water mixes with said coffee grounds in said chamber prior to said coffee flowing out of said outlet.

5. The system of claim 4,
   wherein said source includes a water receptacle coupled to said brew chamber;
   and further comprising:
   a water valve to control flow of said water from said receptacle to said brew chamber; and
   a dispensing valve connected to said outlet and to said timer to control flow of brewed coffee from said brew chamber and the amount of time the cold water and coffee grounds are together in said brew chamber.

6. The system of claim 1 wherein said source includes a water line extending from said source and into said container of coffee grounds.

7. The system of claim 1 and further comprising a timer.

8. A system for cold brewing coffee comprising:
   a container of coffee grounds;
   a source for providing cold water;
   a main frame including a brew chamber for receiving said cold water from said source and holding said container of coffee grounds allow mixing of said water with said coffee grounds, said brew chamber having an outlet to allow brewed coffee to flow therefrom;
   a squeezing mechanism within said brew chamber for holding said container of coffee grounds and squeezing same; and,
   an actuator coupled with said squeezing mechanism for moving said mechanism to squeeze said container of coffee grounds therein, wherein:
   said squeezing mechanism has a pair of mutually opposed perforated walls allowing flow of liquid from said container,
   said walls are movable by said actuator to squeeze said container and create coffee extract within said brew chamber.

9. The system of claim 8 wherein:
   said mutually opposed walls form an upwardly opening v-shape with adjacent bottom ends and spaced apart top ends, said brew chamber has a guide slidably receiving and supporting at least one of said top ends as said actuator moves at least one of said walls toward the other squeezing said container located between said walls.

10. The system of claim 8 wherein:
    said source includes a water receptacle coupled to said brew chamber; and, further comprising:

a water valve to control flow of said water from said receptacle to said brew chamber.

11. The system of claim 10 and further comprising:
a timer; and,
a dispensing valve connected to said outlet and to said timer to control flow of brewed coffee from said brew chamber and the amount of time the cold water and coffee grounds are together in said brew chamber.

12. The system of claim 8 and further comprising a timer.

13. An apparatus for making cold brewed coffee from coffee grounds and cold water comprising:
a receptacle for holding cold water;
a container for holding coffee grounds, said container fluidly in relation to said receptacle for receiving water therefrom;
a housing having a brew chamber and an outlet;
a timer connected to said outlet and said brew chamber to control the period of time said cold water and said coffee grounds are mixed together in said brew chamber; and,
a compressing mechanism within said brew chamber for receiving and holding said container and operable to compress said container holding coffee grounds to produce coffee within said brew chamber;
wherein said container of coffee grounds has a liquid permeable wall with said water line extending into said container.

14. The apparatus of claim 13 wherein:
said receptacle is mounted on said housing and includes an outlet with a pump connected thereto, said receptacle includes a water line connected to said pump and to said container directing water from said receptacle into said container.

15. The apparatus of claim 13 wherein:
said mechanism includes a movable wall and a device for moving said movable wall against said container to squeeze same.

16. The apparatus of claim 13 and further comprising:
water line means connecting said receptacle of cold water to said container and directing said cold water into said container.

17. The apparatus of claim 13 wherein said container has a liquid permeable wall and further comprising:
water line means connecting said receptacle of cold water to said brew chamber for said cold water to flow from said receptacle into said brew chamber with said water flowing through said liquid permeable wall wetting said grounds within said container.

18. The apparatus of claim 13 wherein said brew chamber includes a first valve for controlling water from said receptacle into said container of coffee grounds and a second valve for controlling flow of coffee out of said brew chamber.

* * * * *